United States Patent [19]

Krieg

[11] Patent Number: 5,055,236

[45] Date of Patent: Oct. 8, 1991

[54] METHOD AND APPARATUS FOR UNDERWATER REMOTE CONTROLLED RADIOACTIVE WASTE REDUCTION OF BOILING WATER NUCLEAR REACTOR CONTROL RODS

[76] Inventor: Adrian H. Krieg, 119 Maplevale Dr., Woodbridge, Conn. 06525

[21] Appl. No.: 58,171

[22] Filed: Jun. 4, 1987

Related U.S. Application Data

[63] Continuation-in-part of Ser. No. 776,375, Sep. 16, 1985, abandoned.

[51] Int. Cl.[5] ........................ G21F 9/00; G21C 19/00; B23K 7/00; B26D 7/06

[52] U.S. Cl. ........................ 252/626; 29/723; 83/29; 83/54; 83/455; 266/54; 376/260; 376/261; 376/272

[58] Field of Search ................ 252/626, 627; 144/218, 144/376; 83/29, 54, 23, 425, 452, 455; 376/261, 262, 263, 260; 30/208; 29/723

[56] References Cited

U.S. PATENT DOCUMENTS 4,643,845 2/1987 Omote et al. ........................ 252/626

4,650,606 3/1987 Yamamoto ........................ 252/626

4,747,995 5/1988 Bednarik et al. ........................ 376/260

FOREIGN PATENT DOCUMENTS 0093393 5/1985 Japan ........................ 376/260

*Primary Examiner*—Howard J. Locker

*Attorney, Agent, or Firm*—Cobrin, Feingertz & Gittes

[57] ABSTRACT

Apparatus for cutting a cruciform shaped radioactive control rod into three separate cut sections, the cruciform shaped radioactive control rod being of the type having four substantially equidistantly spaced sheaths extending from and along a large portion of the length thereof, each sheath containing at least one radioactive rod, and a velocity limiter at one end thereof, the apparatus including a first cutting device for cutting the velocity limiter away from the remainder of the control rod to form a first one of the cut sections; and a second cutting device for simultaneously cutting the remainder of the control rod along the lengthwise direction thereof and substantially transverse to the first cutting device, to form two chevron shaped sections as the remaining two of the cut sections.

7 Claims, 6 Drawing Sheets

METHOD AND APPARATUS FOR UNDERWATER REMOTE CONTROLLED RADIOACTIVE WASTE REDUCTION OF BOILING WATER NUCLEAR REACTOR CONTROL RODS

REFERENCE TO RELATED APPLICATION

The present application is a Continuation-In-Part of U.S. patent application Ser. No. 06/776,375, (now abandoned) Sept. 16, 1985 in the name of the same inventor, and entitled APPARATUS FOR UNDERWATER REMOTE CONTROLLED BOILING WATER NUCLEAR REACTOR CONTROL ROD RADIO ACTIVE WASTE REDUCTION.

BACKGROUND OF THE INVENTION

This invention relates generally to nuclear waste disposal and, more particularly, is directed to the volume reduction of radioactive cruciform shaped control rods for storage.

One of the most pressing problems in the nuclear electric generation industry is the disposal of radioactive waste, and particularly of boiling water nuclear reactor (BWR) control rods. Such BWR control rods generally are formed in a cruciform shape having a length of approximately fifteen feet and an outer rectangular circumference of approximately eleven inches. The center spline of the cruciform structure is made of solid 304 stainless steel and has four equiangularly spaced flanges.

A punctured sheath of 304 stainless steel which contains a moderator is spot welded to each of the four flanges of the cruciform center. The moderator held within each sheath includes a plurality of neutron absorption rods, generally made of boron. However, the punctured sheaths have a length less than that of the control rod, and therefore do not extend to the ends of the control rod.

The control rod also includes a handle at its upper end which is made of fabricated 304 stainless steel and is welded to the body of the control rod. The control rod at the handle end is solid stainless steel and is approximately eight inches in length. A velocity limiter is provided at the opposite end of the cruciform shaped control rod, and extends approximately 24 inches along the control rod.

It is often necessary from time to time to remove worn out control rods from the nuclear reactor. This operation is performed when the control rods are extremely radioactive, that is, from 200 to 200,000 REMs/hr. Specifically, the control rods are removed and stored in a vertical position in a spent fuel pool having a depth of approximately forty feet, such that the upper ends of the spent control rods are at least five feet from the surface of the pool, thereby preventing harm from radiation exposure to operating personnel.

The principal problem with such storage is that the amount of space available in the spent fuel pool, and in transport containers, is finite. Since the control rods have a cruciform shape, however, they require a large amount of space, which is undesirable from a storage, transport and reprocessing standpoint.

In this regard, U.S. Pat. No. 4,434,092 to Mary discloses a method and apparatus of reducing the size of cruciform shaped control rods by cutting off the handle and velocity limiter ends thereof. After the ends of the control rods in Mary have been cut off, the remaining cruciform shape remains for storage. However, such cruciform shaped control rod occupies a great amount of space in the spent fuel pool.

U.S. Pat. No. 4,507,840 to Steinert et al. discloses a method of compacting nuclear reactor components in which the cruciform shaped control rod is stacked vertically, and cut sections of a hollow fuel channel are stacked in each quadrant of the cruciform shaped control rod. See also U.S. Pat. No. 4,383,394 to Qurnell et al. for the cutting of hollow fuel channels.

The Steinert et al. Patent also discusses a prior art technique for cutting the cruciform shaped control rods. Specifically, the upper and lower portions are first severed from the main body of the control rod. Then, the individual blade sections of the cruciform structure are removed from the central spine by longitudinal cuts and are then stacked and buried together. However, as recognized by Steinert et al., these latter cuts must be made quite near the central spline since the blades enclose neutron absorber rods which contain radioactive gas. Thus, the cuts are very difficult and time consuming to carry out because the nozzle of a cutting torch or the blade of a saw can not easily fit into the restricted region where the cut must be made.

U.S. Pat. No. 4,431,899 to Racki et al. discloses a laser cutting assembly for cutting a hexagonal casing which contains a plurality of tubes filled with spent nuclear reactor fuel. However, since hexagonal casings are very different from cruciform shaped control rods, this Patent is only marginally relevent to the present invention.

Other references cited in the parent application of the present application, which are less relevant than the above discussed references, but which may be relevant to the present application, are U.S. Pat. Nos. 4,021,886; 4,164,966; 4,434,092; 4,511,499; and 4,588,524; Japanese Patent Publication No. 59-116596; and British Patent Specification No. 1,437,598.

OBJECTS AND SUMMARY OF THE INVENTION

Accordingly, it is an object of the present invention to provide an apparatus that overcomes the aforementioned problems in the prior art.

It is another object of the present invention to provide an apparatus which provides a maximum volume reduction of cruciform shaped control rods for storage and/or transport.

It is still another object of the present invention to provide an apparatus that safely reduces the volume of cruciform shaped control rods.

It is yet another object of the present invention to provide an apparatus that severs the velocity limiter and cuts the remaining cruciform shaped control rod into two chevron shaped sections for storage and/or transport.

It is a further object of the present invention to provide an apparatus that simultaneously severs the velocity limiter and cuts the remaining cruciform shaped control rod into two chevron shaped sections.

It is a still further object of the present invention to provide an apparatus for cutting a cruciform shaped control rod that is efficient, inexpensive and safe.

In accordance with an aspect of the present invention, apparatus for cutting a cruciform shaped radioactive control rod into three separate cut sections, the cruciform shaped radioactive control rod being of the type having four substantially equidistantly spaced sheaths extending from and along a large portion of the length thereof, each sheath containing at least one radioactive modulator rod, and a velocity limiter at one end thereof, the apparatus including first cutting means for cutting the velocity limiter away from the remainder of the control rod to form a first one of the cut sections; and second cutting means for cutting the remainder of the control rod along the lengthwise direction thereof and substantially transverse to the first cutting means, to form two chevron shaped sections as the remaining two of the cut sections.

In accordance with an aspect of the present invention, a method of cutting a cruciform shaped radioactive control rod into three separate cut sections, the cruciform shaped radioactive control rod being of the type having four substantially equidistantly spaced sheaths extending from and along a large portion of the length thereof, each sheath containing at least one radioactive modulator rod, and a velocity limiter at one end thereof, the method including the steps of cutting the velocity limiter away from the remainder of the control rod by first cutting means, to form a first one of the cut sections; and cutting the remainder of the control rod, along the lengthwise direction thereof and substantially transverse to the first cutting means, by second cutting means, to form two chevron shaped sections as the remaining two of the cut sections.

The above and other objects, features and advantages of the present invention will become readily apparent from the following detailed description which is to be read in connection with the accompanying drawings.

DETAILED DESCRIPTION OF A PREFERRED EMBODIMENT

Figure 6:
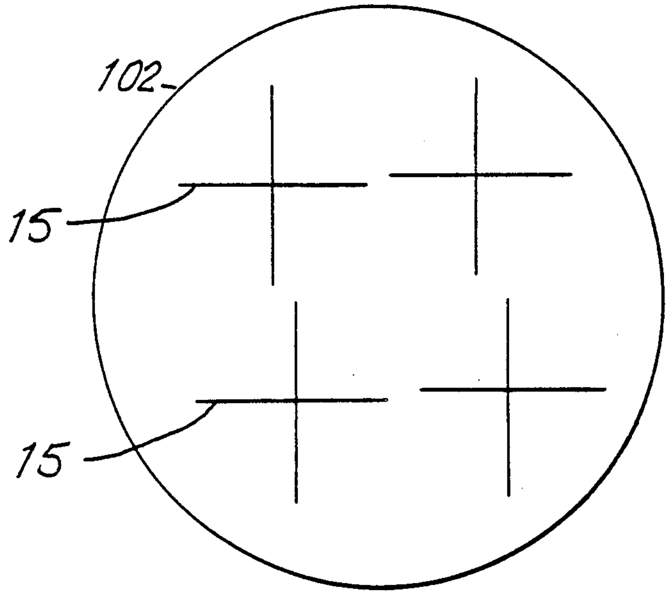
FIG. 6 PRIOR ART
FIG. 6 is a top plan view showing storage of cruciform shaped control rods according to the prior art.
Figure 7:
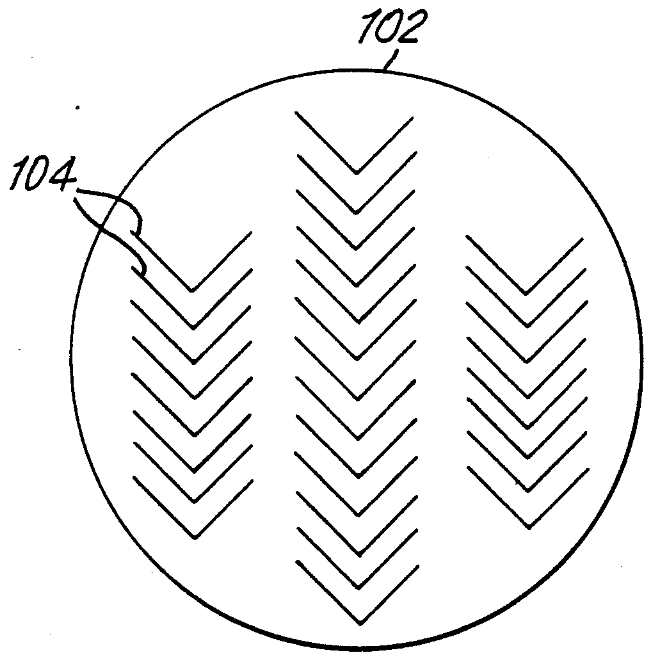
FIG. 7 is a top plan view showing storage of cruciform shaped control rods according to the present invention.

Referring to the drawings in detail, and initially to FIG. 6 thereof, there is shown a spent fuel pool 102 having cruciform shaped control rods 15 stored therein according to the prior art. As will be evident from this Figure, control rods 15 occupy a great amount of space. To the contrary, according to the present invention, cruciform shaped control rods 15 are cut in half along a longitudinal center line to form a plurality of chevron shaped sections 104, which can be stored with great compactness, as shown in FIG. 7.

Referring now to FIGS. 1–5, apparatus 10 for cutting cruciform shaped control rods 15 into three sections, namely, a velocity limiter section **15*b* and two chevron shaped sections 104 will now be described. As shown, apparatus 10 includes an elongated containment vessel 14 which is open at the upper end thereof and through which a control rod 15 can be loaded and unloaded. Control rod 15, as is conventional, includes a main body 15*a* having a cruciform shape, and a velocity limiter section 15*b* at one end of main body 15*a*. Main body 15*a* includes a central spline 300 with four blades 302 connected with central spline 300**, as shown best in FIG. 5.

Figure 3:
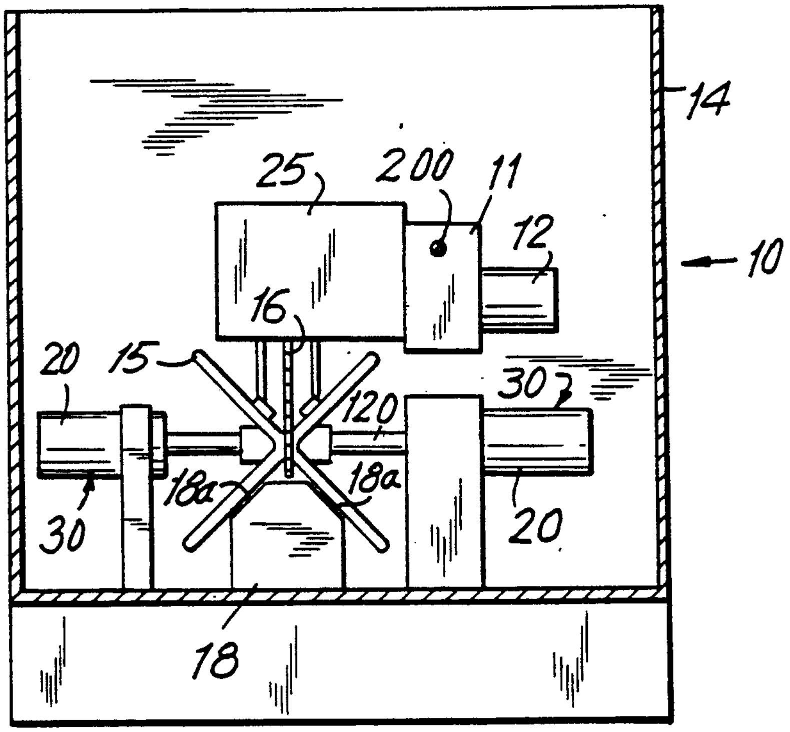
FIG. 3 is an end elevational view of the apparatus of FIG. 1.
Figure 5:
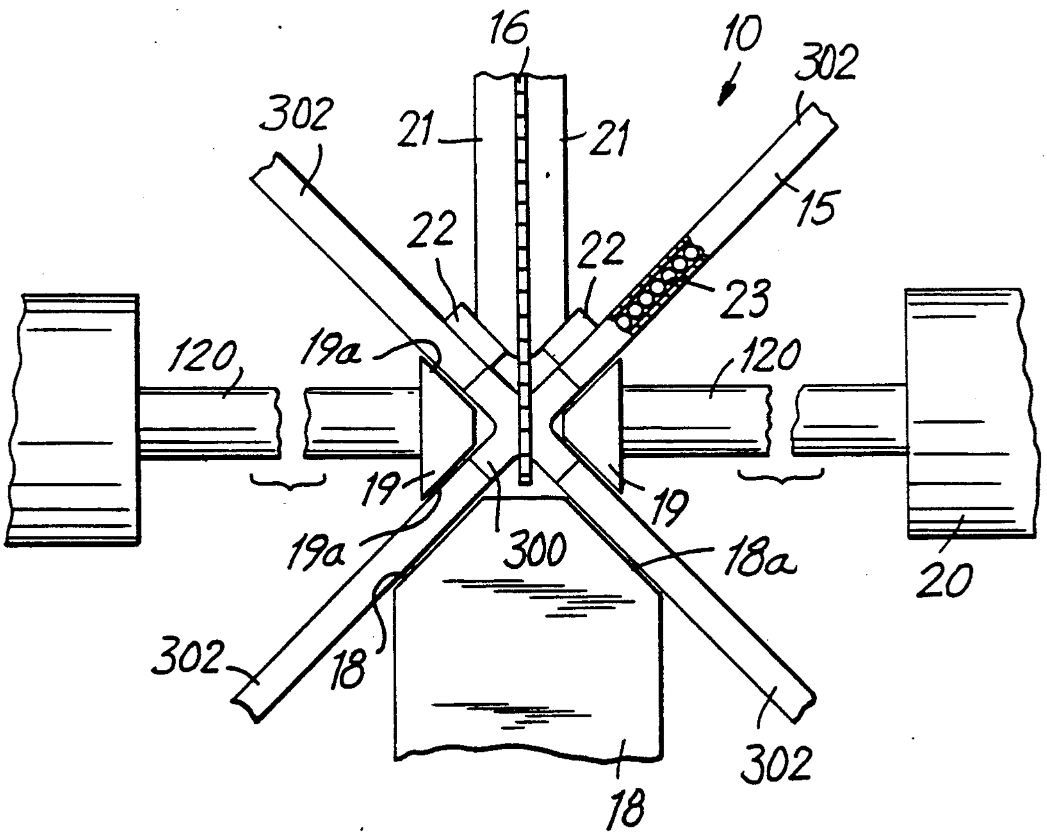
FIG. 5 is an enlarged, partially cut away end elevational view of a portion of the apparatus of FIG. 3.

Holding and aligning supports 18 are mounted at the inner bottom of containment vessel 14, with upper side edges **18*a* thereof being beveled, as shown in FIGS. 3 and 5, for receiving main body 15*a*, and in particular, the lower two sheaths, thereon. Further, supports 26 mounted to a side wall of containment vessel 14 are used to support velocity limiter section 15*b*. Once control rod 15 is supported on holding and aligning supports 18 and supports 26, it is clamped by side clamping mechanisms 30** positioned in opposing relation on opposite sides thereof.

Each side clamping mechanism 30 includes a positioning and retraction cylinder 20 located to one side of main body **15*a* of control rod 15, a piston rod 120 extending from cylinder 20 and movable to the extended position of FIG. 5 or to a retracted position, and a side holding support 19 secured to the free end of piston rod 120. Opposing side holding supports 19, when the respective piston rods 120 are in their extended positions, clamp main body 15*a* therebetween. Preferably, as shown in FIG. 5, side holding supports 19 have their free ends beveled, as at 19*a*, at the same angle existing between adjacent sheaths of main body 15*a*, so as to accurately align and clamp control rod 15**.

Once control rod 15 is clamped, it can then be cut according to the present invention. Specifically, apparatus 10 further includes a first circular saw 25 for cutting main body **15*a* longitudinally thereof to produce two chevron shaped sections 104, and a second reciprocating saw 17 for cutting velocity limiter section 15*b* from main body, both saws 17 and 25** preferably being operated simultaneously.

Figure 1:
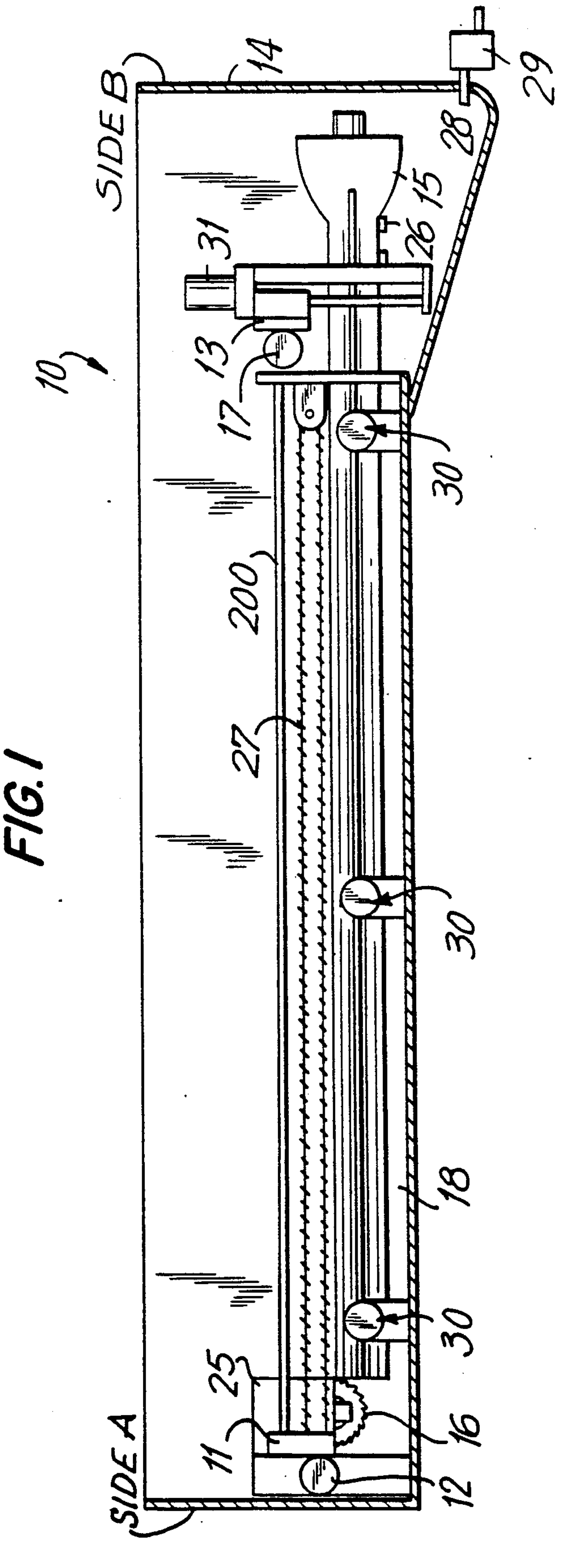
FIG. 1 is a side elevational view of apparatus according to the present invention, for cutting a cruciform shaped control rod.
Figure 2:
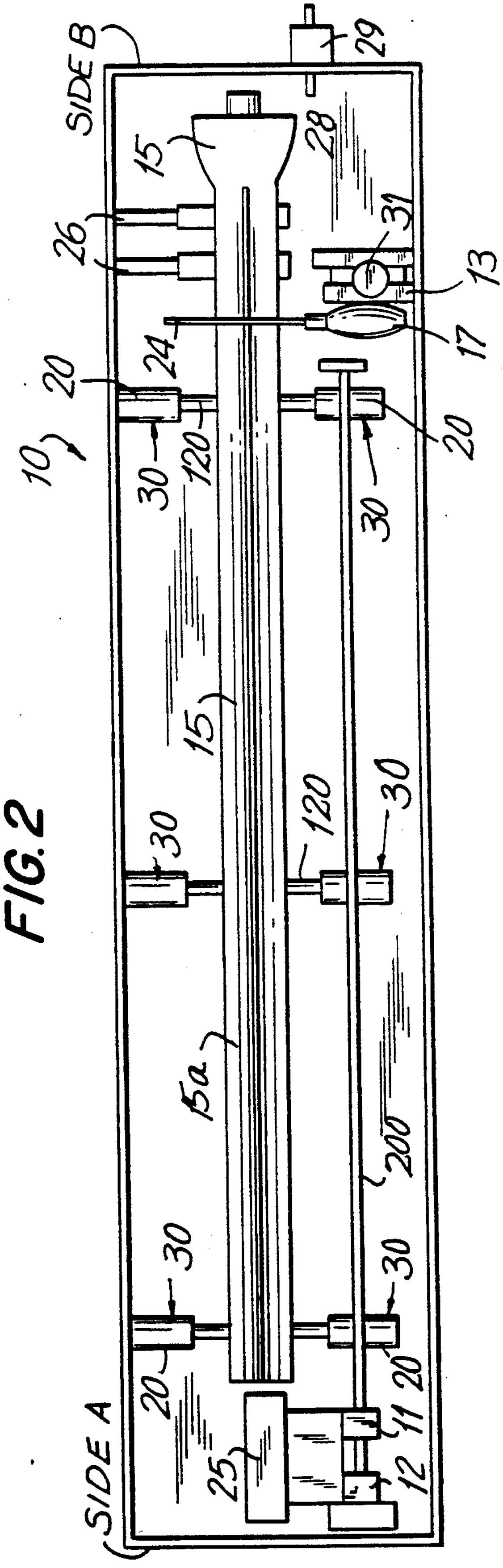
FIG. 2 is a top plan view of the apparatus of FIG. 1.
Figure 4:
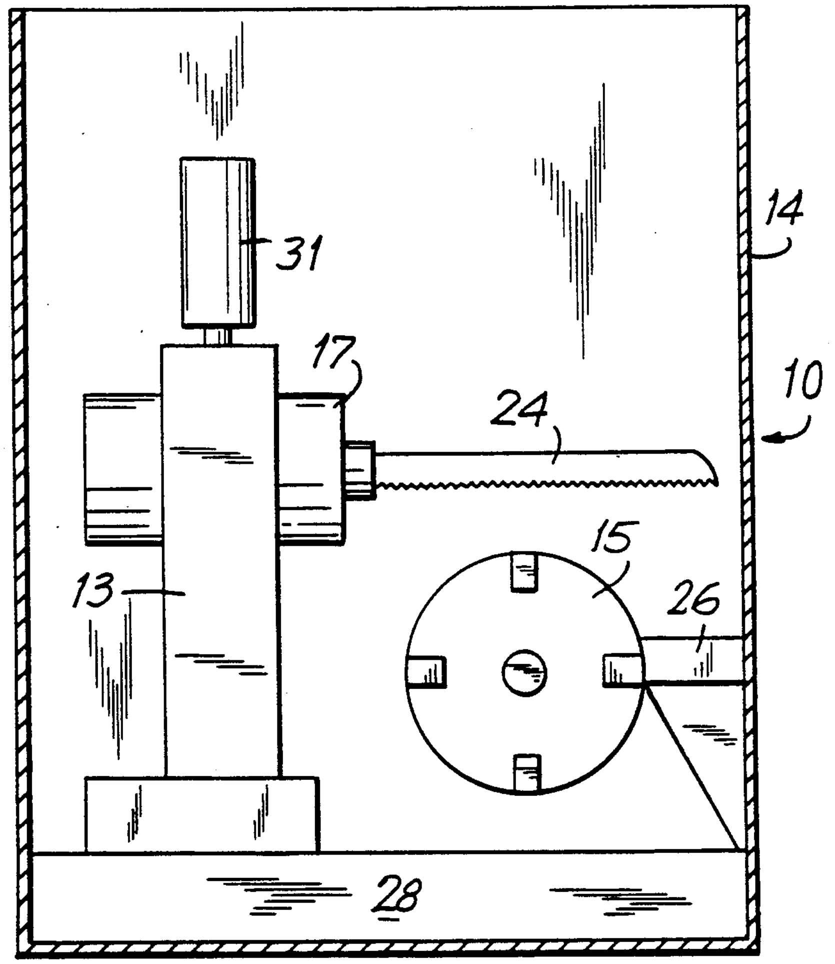
FIG. 4 is an opposite end elevational view of the apparatus of FIG. 1.

Saw 17 is preferably a hydraulic reciprocating saw, and has a reciprocating blade 24, as shown in FIGS. 1, 2 and 4. Reciprocating saw 17 is secured to a vertical linear slide 13 secured to the bottom of containment vessel 14 for movement vertically with slide 13. A hydraulic feed motor 31 is connected with slide 13 and is used to drive slide 13 up or down in the vertical direction, and thereby to move reciprocating saw 17 in the same manner. In this manner, saw blade 24 can be moved vertically downward, while also reciprocating, to cut velocity limiter section **15*b* from main body 15*a*. Specifically, saw blade 24 cuts through control rod 15*a* in close proximity to velocity limiter section 15*b*, thus cutting it free from main body 15*a*. After velocity limiter section 15*b* is cut away from main body 15*a*, it is held by supports 26** until it is later removed.

Circular saw 25 includes a rotating circular saw blade 16 positioned centrally above control rod 15. Circular saw 25 is secured to a linear feed mechanism 11 which is slidably mounted on a rod 200 supported at opposite ends thereof and which is driven therealong by a feed motor drive 12 through a stainless steel drive chain 27. Accordingly, circular saw 25 travels the length of main body **15*a* of control rod 15 to cut the same into two chevron shaped sections 104, without disturbing the boron rods 23 in each sheath of control rod 15. The depth of the cut by circular saw blade 16 is controlled by blade depth control stops 21 secured to circular saw 25 at opposite sides of blade 16, and stop rollers 22 secured to free ends of blade depth control stops 21, the latter rolling along the upper surfaces of the upper sheaths of control rod 15. In other words, blade depth control stops 21 and stop rollers 22 determine the height of saw 25 above control rod 15**.

In addition, a chip location area 28 is provided at the bottom of containment vessel 14 to receive shavings from the cutting operation, along with a submersible pump and filtration system 29 thereat so as to prevent any possible pollution of the spent fuel pool.

In operation, containment vessel 14 is lowered into the spent fuel pool, and the attached to the sides of the pool approximately five to ten feet underwater. Containement vessel 14 is then flooded, and submersible pump and filtration system 29 is then connected. Control rod 15 comprised of main body 15*a* and velocity limiter section 15*b* is then lowered onto holding and aligning supports 18 and supports 26, and clamping mechanisms 30 are actuated to move side holding supports 19 into holding engagement with control rod 15. As such, control rod 15 is now held in a fixed position.

Reciprocating saw 17 is then actuated to cut off velocity limiter section 15*b* from main body 15*a*, and simultaneously therewith, circular saw 25 is actuated to cut the cruciform shaped main body 15*a* into two chevron shaped sections 104. Then, clamping mechanisms 30 are retracted, and the three separate sections, namely, velocity limiter section 15*b* and the two chevron shaped sections 104, can be removed.

Because of this arrangement, there is an efficiency in the cutting operation. Further, because main body 15*a* is cut along a center longitudinal line, there is no need to worry about accuracy in cutting off each sheath, since the cutting is far removed from boron rods 23. In addition, because main body 15*a* is cut into two chevron shaped sections 104, there is a compactness in storage of the same, as shown in FIG. 7, as compared with the prior art of FIG. 6.

Having described a specific preferred embodiment of the invention with reference to the accompanying drawings, it will be appreciated that the present invention is not limited to that precise embodiment, and that various changes and modifications may be effected therein by one of ordinary skill in the art without departing from the scope or spirit of the invention as defined in the appended claims.

What is claimed is:

1. Apparatus for cutting a cruciform shaped radioactive control rod into three separate cut sections, said cruciform shaped radioactive control rod being of the type having four substantially equidistantly spaced sheaths extending from a central spline along a large portion of the length thereof, each sheath containing at least one radioactive modulator rod, and a velocity limiter at one end thereof, said apparatus comprising:

first cutting means for cutting said velocity limiter away from the remainder of said control rod to form a first one of said cut sections; and second cutting means for cutting, simultaneously with said cutting by said first cutting means, the central spline into two equal sections along the lengthwise direction thereof and substantially transverse to said first cutting means, to form two chevron shaped sections as the remaining two of said cut sections.

2. Apparatus according to claim 1; wherein said first cutting means includes a reciprocating saw; and means for moving said reciprocating saw vertically to cut said velocity limiter away from the remainder of the control rod.

3. Apparatus according to claim 1; wherein said second cutting means includes a circular saw; and further including means for feeding said circular saw substantially linearly along the lengthwise direction of the remainder of said control rod.

4. Apparatus according to claim 3; further including means for controlling the depth of said circular saw in the remainder of said control rod during cutting thereof.

5. Apparatus according to claim 1; further including means for securely holding the cruciform shaped radioactive control rod, said means for holding including support means for supporting and aligning said radioactive control rod and clamp means for clamping said radioactive control rod on said support means.

6. A method of cutting a cruciform shaped radioactive control rod into three separate cut sections, said cruciform shaped radioactive control rod being of the type having four substantially equidistantly spaced sheaths extending from and along a large portion of the length thereof, each sheath containing at least one radioactive rod, and a velocity limiter at one end thereof, said method comprising the steps of:

cutting said velocity limiter away from the remainder of said control rod by first cutting means, to form a first one of said cut sections; and cutting the remainder of the control rod, simultaneous with said step of cutting said velocity limiter, along the lengthwise direction thereof and substantially transverse to said first cutting means, by second cutting means, to form two chevron shaped sections as the remaining two of said cut sections.

7. A method of cutting a cruciform shaped radioactive control rod into three separate cut sections, said cruciform shaped radioactive control rod being of the type having four substantially equidistantly spaced sheaths extending from a central spline along a large portion of the length thereof, each sheath containing at least one radioactive modulator rod, and a velocity limiter at one end thereof, said method comprising the steps of:

cutting said velocity limiter away from the remainder of said control rod to form a first one of said cut sections; and forming two chevron shaped sections, simultaneously with said step of cutting said velocity limiter, as the remaining two of said cut sections from the remainder of said control rod, said step of forming including the step of cutting the central spline into two equal sections along the lengthwise direction thereof and substantially transverse to said first cutting means.

* * * * *